Patented Sept. 10, 1940

2,214,286

UNITED STATES PATENT OFFICE 2,214,286

ADHESIVE

Josef Schmucker, Dresden, Germany

No Drawing. Application January 11, 1937, Serial No. 120,121. Renewed March 9, 1940. In Germany April 3, 1930

6 Claims. (Cl. 134—23.5)

This invention relates to a process of producing an adhesive substance for leather.

Adhesive substances are known already which substantially consist of Celluloid, resin, acetone, and nitrobenzene, or of solutions of these substances. The adhesives produced therefrom are, however, open to the objection that their binding power is slight and that they fail to enter deeply enough the pores of the leather. To attain an adhesive effect when these known adhesives are used it is necessary, prior to applying them, to roughen the leather, i. e., to render the surface thereof fibrous. Furthermore, the connections produced require much time for drying.

The invention eliminates these drawbacks by providing a process for producing adhesives for leather, which consists in adding to the known adhesive mass comprising a solution of Celluloid and resin in acetone and nitrobenzene a tanning extract prepared by treating oak bark and galls with acetone and spirit.

The adhesive obtained by applying the new process affords the advantage of entering the pores of the leather to a considerable depth without requiring previous roughening of the surface thereof. Simple washing with solvents is sufficient. The elimination of the roughening step saves time, and after application the adhesive dries much more quickly. Furthermore, owing to the depth of penetration, greater strength is imparted to the connection established.

The addition of spirit insures rapid and thorough extraction of the oak bark and galls and much quicker drying of the adhesive. This drying process can be intensified still more by the addition of oils, particularly eucalyptus oil.

The adhesive is preferably prepared as follows:

| Mix | Parts by weight |
|---|---|
| Celluloid | 190 |
| Acetone | 760 |
| Tree resin | 50 |

Separately mixed are:

| | Parts by weight |
|---|---|
| Cut oak bark | 150 |
| Rough-ground galls | 100 |
| Castor oil | 50 |
| Eucalyptus oil | 50 |
| Oil of mirbane | 50 |
| Acetone | 500 |
| Spirit | 500 |

This mixture is allowed to stand approximately a fortnight, whereupon about 1,150 parts by weight tannic solution are obtained by drawing off and filtering. Then 600 parts by weight of the first-described adhesive are thoroughly stirred with 400 parts by weight of the tannic solution in a suitable container, and this mixture is allowed to stand again about 6 days to insure intimate union of the constituents. The resulting adhesive discloses the advantages mentioned above.

I claim:

1. An adhesive for leather consisting of a solution of Celluloid and resin in acetone and of an addition to this solution of a tanning extract prepared by mixing 150 parts by weight cut oak bark, 100 parts of weight rough-ground galls, 500 parts by weight acetone, 500 parts by weight spirit and enough eucalyptus oil to insure quick drying of the adhesive produced.

2. An adhesive for leather consisting of a solution of Celluloid and resin in acetone and of an addition to this solution of a tanning extract prepared by mixing 150 parts by weight cut oak bark, 100 parts by weight rough-ground galls, 500 parts by weight acetone, 500 parts by weight spirit and 150 parts by weight eucalyptus oil.

3. An adhesive for leather consisting of a solution of Celluloid and resin in acetone and of an addition to this solution of a tanning extract prepared by mixing 150 parts by weight cut oak bark, 100 parts by weight rough-ground galls, 500 parts by weight acetone, 500 parts by weight spirit and 50 parts by weight castor oil.

4. An adhesive for leather consisting of a solution of Celluloid and resin in acetone and of an addition to this solution of a tanning extract prepared by mixing 150 parts by weight cut oak bark, 100 parts by weight rough-ground galls, 500 parts by weight acetone, 500 parts by weight spirit and 50 parts by weight oil of mirbane.

5. An adhesive for leather consisting of a solution of Celluloid and resin in acetone and of an addition to this solution of a tanning extract prepared by mixing 150 parts by weight cut oak bark, 100 parts by weight rough-ground galls, 500 parts by weight acetone, 500 parts by weight spirit, 50 parts by weight castor oil and 50 parts by weight oil of mirbane.

6. An adhesive for leather consisting of a solution of Celluloid and resin in acetone and of an addition to this solution of a tanning extract prepared by mixing 150 parts by weight cut oak bark, 100 parts by weight rough-ground galls, 50 parts by weight castor oil, 50 parts by weight eucalyptus oil, 50 parts by weight oil of mirbane, 500 parts by weight acetone and 500 parts by weight spirit.

JOSEF SCHMUCKER.